(12) United States Patent
Bartschies et al.

(10) Patent No.: US 12,497,814 B2
(45) Date of Patent: Dec. 16, 2025

(54) SUPPORT DEVICE, IN PARTICULAR FOR A VEHICLE FLAP

(71) Applicant: Edscha Engineering GmbH, Remscheid (DE)

(72) Inventors: Christian Bartschies, Remscheid (DE); Jochen Bals, Remscheid (DE); Marek Bady, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/726,791

(22) PCT Filed: Dec. 1, 2022

(86) PCT No.: PCT/DE2022/100901
§ 371 (c)(1),
(2) Date: Jul. 4, 2024

(87) PCT Pub. No.: WO2023/131369
PCT Pub. Date: Jul. 13, 2023

(65) Prior Publication Data
US 2025/0067109 A1 Feb. 27, 2025

(30) Foreign Application Priority Data

Jan. 4, 2022 (DE) ...................... 10 2022 100 147.4

(51) Int. Cl.
*E05F 15/622* (2015.01)
(52) U.S. Cl.
CPC ......... *E05F 15/622* (2015.01); *E05Y 2201/21* (2013.01); *E05Y 2201/242* (2013.01)
(58) Field of Classification Search
CPC ........ F16D 59/00; F16D 59/02; E05F 15/622; B62D 25/12; F16H 25/2454
(Continued)

(56) References Cited

U.S. PATENT DOCUMENTS 484,587 A * 10/1892 Gould ..................... F16D 59/00
73/535
1,191,254 A * 7/1916 White ..................... F16D 59/00
400/338.1
(Continued)

FOREIGN PATENT DOCUMENTS

DE 102007029591 A1 1/2009
DE 102009030272 A1 12/2010
(Continued)

OTHER PUBLICATIONS

Search Report for Corresponding International Application PCT/DE2022/100901.

*Primary Examiner* — T. Scott Fix
(74) *Attorney, Agent, or Firm* — Davidson Kappel LLC

(57) ABSTRACT

The present disclosure relates to a support device, in particular for a vehicle flap, comprising a housing (2) which can be connected between the vehicle flap and the vehicle body and which comprises at least one first housing part (3) and a second housing part (4) said first housing part (3) and second housing part (4) are movable relative to each other in a telescopically guided manner. The support device also includes a spindle drive (8) which is coupled to the housing (2). The spindle drive (8) comprises a spindle rod (9) and a spindle nut (10) which is in thread engagement with the spindle rod (9), and one of the aforementioned components, i.e. the spindle rod (9) and the spindle nut (10), is rotatably arranged in the housing (2) about a spindle axis (S) and the respective other component is rotationally fixed in the housing (2). The support device also includes a first brake device (16) which is coupled to one of the aforementioned components in order to brake the rotation of the said component. The first brake device (16) can be activated by (Continued)

being rotated relative to the housing (2) about a central rotational axis via centrifugal forces.

20 Claims, 4 Drawing Sheets

(58) Field of Classification Search
USPC .............. 188/184, 189; 192/140, 141, 223.3
See application file for complete search history.

(56) References Cited

U.S. PATENT DOCUMENTS

| | | | | |
|---|---|---|---|---|
| 2,388,946 | A * | 11/1945 | Beall | G05D 13/00 49/138 |
| 3,576,242 | A * | 4/1971 | Mumma | B65G 13/075 188/185 |
| 3,645,363 | A * | 2/1972 | Fuths | B41J 19/02 400/338.1 |
| 4,015,696 | A * | 4/1977 | Lichti | F16D 59/00 188/189 |
| 4,254,854 | A * | 3/1981 | St. John | F16D 43/18 192/105 CD |
| 10,208,816 | B2 * | 2/2019 | Keck | F04D 15/0077 |
| 2009/0000201 | A1 | 1/2009 | Fahl | |
| 2009/0107051 | A1 | 4/2009 | Talpe | |
| 2015/0101147 | A1 | 4/2015 | Hsieh | |
| 2015/0211279 | A1 | 7/2015 | Suzuki et al. | |
| 2018/0135708 | A1 * | 5/2018 | Jacobson | F16D 59/00 |
| 2020/0284329 | A1 * | 9/2020 | Soltermann | B66F 7/0666 |

FOREIGN PATENT DOCUMENTS

| | | | |
|---|---|---|---|
| DE | 102016118687 A1 | 4/2018 | |
| WO | WO-9316298 A1 * | 8/1993 | ............. F16D 59/00 |
| WO | WO-2020139799 A1 * | 7/2020 | ............. B60T 1/067 |

* cited by examiner

SUPPORT DEVICE, IN PARTICULAR FOR A VEHICLE FLAP

The present disclosure relates to a support device, in particular for a vehicle flap.

BACKGROUND

In practice, support devices such as suspension struts or gas springs are known which are used in particular to support vehicle flaps. In particular, such support devices are used for tailgates driven on one side, wherein the tailgate is connected to a drive device on a first side and to such a support device on an opposite second side. The drive device has a motor unit, which as generally drives an actuator via a gearbox, which actuator drives the tailgate between a fully open and a fully closed position. As a rule, such drive devices are designed as spindle drives. In contrast, the support device as a rule acts permanently on the tailgate in the direction of the open position or against lowering the tailgate into the closed position. In particular in the event of a defect in the drive unit, the support device is intended to prevent the tailgate from lowering without any braking, since this poses a risk of injury to people in the adjustment range of the flap due to collision or pinching. However, in the event that the drive device is completely removed, either intentionally or by breaking off a connecting element between the vehicle tailgate and the drive device, the support devices known from the prior art are usually only able to provide sufficient holding force to keep the tailgate in the open position when the tailgate is in a fully open position. In particular when the flap is positioned between the fully open and closed position, support devices designed as simple suspension struts or gas springs cannot adequately prevent the flap from lowering.

DE 10 2016 118 687 A1 shows a drive device comprising a telescopically retractable and extendable housing, wherein the housing comprises a first housing part and a second housing part, which are movable relative to each other in a direction parallel to a housing axis of the housing. Furthermore, the spindle unit shown comprises a spindle device arranged in the housing with a spindle axis for generating linear movement between two connecting elements arranged at opposite ends of the housing, which are designed as ball sockets. The spindle unit can be connected in an articulated manner between a vehicle body and a vehicle flap via the connecting elements. The spindle device comprises a spindle with an external spindle thread and a spindle nut with an internal spindle nut thread, which together form a screw engagement. To provide an additional friction element, the spindle unit further comprises a brake device that supports a braking of a rotation of the spindle relative to the spindle nut, wherein the brake device comprises a brake element that is in force-fitting contact with one of the spindle and spindle nut. The brake device comprises a first pretensioning means formed as a wrap spring, which pretensions the brake element radially against one of the external spindle thread and internal spindle nut thread and thus generates an additional braking torque, which leads to increased braking of the rotation of the spindle relative to the spindle nut for at least one direction of rotation. In a first exemplary embodiment, the pretensioning of the brake element in the direction of the respective thread is controlled in that varying internal diameters or alternatively wedge structures are provided on the inner side of a guide tube provided for guiding the spindle or spindle nut, which generate correspondingly smaller or larger pretensioning at predetermined positions by increasing or decreasing the diameter of the wrap spring. Alternatively, it is proposed that the brake element is provided in a fixed position on the inner side of the guide tube and that the braking torque is controlled by varying the cross-sectional shape of the threads in the direction of the spindle axis.

A disadvantage of the drive device shown is that an increased braking torque is only generated for certain positions of the vehicle flap between the fully open and closed position, since an increase in the braking torque is substantially predetermined by the axial position of the spindle or spindle nut relative to the guide tube.

DE 10 2007 029 591 A1 shows a drive device, in particular for a flap of a vehicle, with a first housing part, which can be connected to one of the vehicle body and vehicle flap, a second housing part and a third housing part that is guided in the second housing part, can be telescopically moved and can be connected to the other of the vehicle body and vehicle flap. The drive device also comprises a spindle drive consisting of a spindle rod and a spindle nut arranged on the spindle rod, by means of which the third housing part can be driven axially relative to the second housing part by means of a rotary drive. The drive device further comprises a brake device designed as a magnetic centrifugal brake, which comprises a first brake element that is fixed relative to the first housing part, wherein the first brake element comprises a pot into which a magnetic ring is inserted. Furthermore, the brake device comprises two second brake elements, which are designed as brake shoes and can be rotationally fixed in a guide arrangement that can be rotatably driven via a rotary drive, but can be displaced in a radial direction against the attractive force acting on the brake shoes by the magnetic ring. The brake device is designed in such a way that it is active when the rotary drive is not active, i.e., if the flap or spindle drive is not moving, since in this case the brake shoes or second brake element are pulled towards the first brake element by the magnetic ring and are in contact with it, and a braking force is thus generated. However, if the rotary drive is active and the flap or the spindle drive is moved, the centrifugal force acting on the brake shoes as a result of the rotary movement causes the brake shoes to be displaced outwards so that they are no longer in contact with the first brake element and no braking force is applied.

US 2015/0101147 A1 shows a centrifugal brake for a revolving door, wherein the centrifugal brake is only activated for one of the two directions of rotation. For this purpose, a spring-loaded pin with a slanted side surface on one side is provided which serves to ensure that the brake shoes in the centrifugal brake are only rotated in one direction together with a concentrically arranged axis of rotation.

US 2009/0107051 A1 shows a locking mechanism for a door leaf or also a garden gate, wherein the locking mechanism comprises a conversion device for converting a linear movement between two connecting points of the locking mechanism into a rotary movement. The conversion device comprises a rack-and-pinion drive with a rack that engages with an elongated rack, which moves along its axial extension when the door is opened or closed. The locking mechanism also comprises a centrifugal brake, which is driven when the rack-and-pinion drive is actuated and thus exerts a braking force on the axial displacement of the rack.

SUMMARY

It is an object of the present disclosure to provide a support device, in particular for a vehicle flap, which in particular brakes or prevents an undesired closing movement of the vehicle flap in a secure and reliable manner in each position of the vehicle flap.

According to one aspect of the present disclosure, a support device is provided, in particular for a vehicle flap, comprising a housing which can be connected between the vehicle flap and the vehicle body and which comprises at least a first housing part and a second housing part, wherein the first housing part and the second housing part can be displaced relative to each other in a telescopically guided manner. Furthermore, the support device comprises a spindle drive coupled to the housing, wherein the spindle drive comprises a spindle rod and a spindle nut in thread engagement with the spindle rod and wherein one of the spindle rod and the spindle nut is arranged in the housing rotatably about a spindle axis and the other of the spindle rod and the spindle nut is arranged in the housing non-rotatably. Further, the support device comprises a first brake device coupled to the one of the spindle rod and the spindle nut in order to brake the rotation of the one of the spindle rod and the spindle nut. The support device is characterized by the fact that the first brake device can be activated by rotating it relative to the housing about a central axis of rotation via centrifugal forces. Advantageously, the support device enables a vehicle flap to be securely supported at all times, which vehicle flap can be driven in particular via a one-sided drive. A one-sided drive is understood to mean that a drive device arranged on a first side of a vehicle flap is provided, which as a rule is designed as a spindle drive, and a support device arranged on a second side of the vehicle flap is provided, which is designed as a mechanical or hydraulic suspension strut, such as a gas spring. In particular in the event that the drive side of the vehicle flap, i.e., the side on which the drive device is arranged, fails or a connecting element via which the drive side is connected to the vehicle breaks off, the support device according to the present disclosure on the other side of the vehicle flap is able to brake and stop the vehicle flap moving in the closing direction due to its own weight, so that injuries to persons located in the adjustment range of the vehicle flap are reliably prevented.

Preferably, the spindle rod is coupled to one of the first housing part and the second housing part and the spindle nut is coupled to the other of the first housing part and the second housing part. Further preferably, the first housing part can be coupled to one of the vehicle flap and the vehicle body and the second housing part can be coupled to the other of the vehicle flap and the vehicle body. Advantageously, the spindle drive is actuated during a relative movement of the first housing part relative to the second housing part, i.e., the one of the spindle rod and spindle nut is set in rotation, wherein when a threshold value of the rotational speed is exceeded, the activation of the brake device is effected and thus a stopping of the rotation of the one of the spindle rod and spindle nut about the spindle axis is brought about, and thus the moving of the first housing part relative to the second housing part is also stopped.

In an expedient further development, it is provided that the rotation of the brake device about the central axis of rotation can be driven by rotating one of the spindle rod and spindle nut about the spindle axis. Advantageously, the centrifugal forces required to activate the brake device are generated by the sufficiently rapid movement of the vehicle flap, since the spindle drive is actuated by the movement of the vehicle flap and one of the spindle rod and spindle nut is set in rotation. This has the advantage of ensuring that a rapid lowering movement of a tailgate, for example, is automatically and reliably stopped by the support device if the drive side fails.

Particularly preferably, the brake device comprises a first centrifugal body, wherein the first centrifugal body is displaced into a coupling position when a threshold value of the rotational speed of the brake device about the central axis of rotation is exceeded, and the first centrifugal body is coupled in the coupling position in a rotationally fixed manner relative to the housing. Advantageously, the first centrifugal body forms a brake element fixed to the housing, against which one of the spindle rod and spindle nut can be braked and stopped via the brake device. In a practical embodiment, it is provided that the first centrifugal body is pivotable about a first pivot axis. Alternatively or additionally, it is advantageously provided that the first centrifugal body can be extended radially outwards. Advantageously, the centrifugal body is pivoted radially outwards about the first pivot axis and/or extended radially outwards due to the centrifugal forces acting on the first centrifugal body when the threshold value of a rotational speed of the brake device about the central axis of rotation is exceeded, so that the first centrifugal body can come into contact with a component that is stationary and rotationally fixed relative to the housing.

Particularly preferably, the stationary and rotationally fixed component is formed by the housing itself or one of the first housing part and the second housing part.

In a particularly preferred embodiment, it is provided that the first centrifugal body remains in the coupling position even after the rotational speed of the brake device has fallen below the threshold value. In particular, the first centrifugal body also remains in the coupling position if the rotation of the first brake device about the central axis of rotation is completely stopped. Advantageously, it is achieved that the brake device remains active after activation via centrifugal forces, so that the further lowering of the vehicle flap is reliably prevented.

In an expedient further development, the first centrifugal body can be displaced into the coupling position by rotating the brake device in a first direction of rotation. Preferably, the first centrifugal body can be displaced from the coupling position to a decoupling position by rotating the brake device in a second direction of rotation opposite to the first direction of rotation. Advantageously, it is thereby possible to deactivate the brake device again, for example by lifting the vehicle flap in the opening direction, wherein a rotation of the brake device about the central axis of rotation in the second direction of rotation is driven by coupling one of the spindle rod and spindle nut with the brake device, thus deactivating the brake device by returning the first centrifugal body to the decoupling position. In an advantageous further development, it is provided that the first pivot axis of the first centrifugal body is at a distance from the central axis of rotation. This advantageously makes it possible to move the centrifugal body further radially outwards due to its longitudinal extension and also to increase the braking force.

Particularly preferably, the brake device comprises a spring part, which is provided for pretensioning the first centrifugal body against the centrifugal forces. Expediently, the first centrifugal body is pretensioned radially in the direction of the central axis of rotation via a mechanical spring part.

Advantageously, the brake device is only activated when the rotational speed of one of the spindle rod and spindle nut exceeds a set threshold value. In particular, the brake device is not activated during normal operation, i.e., if the vehicle flap is moved normally via a drive device or manually in the opening/closing direction. In contrast, the brake device is activated if the vehicle flap threatens to lower or move at a relatively high speed due to a failure of the drive unit or due to impermissibly high external forces. In this case, the threshold value of the rotational speed of one of the spindle rod and spindle nut set by the spring part is exceeded and the first centrifugal body is pivoted outwards against the pretensioning of the mechanical spring part and causes a braking and a stopping of the lowering movement of the vehicle flap.

In an expedient further development, the brake device comprises a second centrifugal body, which is pivotable about a second pivot axis. Preferably, the second pivot axis is at a distance from the central axis of rotation, about which the first centrifugal body and the second centrifugal body can rotate together. A spring part is particularly preferably arranged between the first centrifugal body and the second centrifugal body, wherein the spring part pretensions the first centrifugal body and the second centrifugal body radially towards each other in the direction of the central axis of rotation.

In a practical embodiment, it is provided that the first centrifugal body is coupled in the coupling position in a rotationally fixed manner with respect to the housing by means of force fit. The first centrifugal body particularly preferably has a first friction element. Expediently, the second centrifugal body has a second friction element. The first friction element is preferably received and fastened in a recess in the first centrifugal body. The first friction element expediently protrudes radially from the first centrifugal body. The second friction element is preferably received and fastened in a recess in the second centrifugal body.

The second friction element expediently protrudes radially from the second centrifugal body. In an advantageous embodiment, the first friction element is detachable and connected to the first centrifugal body. In a further advantageous embodiment, the second friction element is detachable and connected to the second centrifugal body. Advantageously, the friction elements can be easily replaced if this is necessary, for example due to advanced wear.

Alternatively or additionally, in a further development it is provided that the first centrifugal body in the coupling position is coupled in a rotationally fixed manner with respect to to the housing by means of a form fit. For this purpose, the first centrifugal body can, for example, comprise a radially outward-pointing partial gear wheel, which can be brought into engagement with a corresponding mating gear wheel fixed to the housing if the first centrifugal body is displaced outwards by the centrifugal forces.

In a practical embodiment, it is provided that the central axis of rotation and the spindle axis are coaxial. Advantageously, the rotary movement of the brake device about the central axis of rotation can be driven directly by the rotation of the spindle rod and spindle nut without great effort. Particularly preferably, the brake device comprises a first brake element, which is coupled to one of the spindle rod and spindle nut. Furthermore, the brake device comprises a base body, wherein the first brake element is preferably frictionally coupled to the base body. The base body is advantageously coupled to the first centrifugal body, so that the base body is also rotationally set relative to the housing when the first centrifugal body is displaced into the coupling position. Advantageously, a braking of the rotation of the spindle rod and spindle nut about the spindle axis is activated. In a particularly preferred embodiment, the first brake element is designed as a wrap spring, which is pressed into the base body of the brake device.

Expediently, the first brake element has a first end that can be coupled to one of the spindle rod and spindle nut. Advantageously, the first brake element ensures, on the one hand, that the rotary movement of the one of the spindle rod and spindle nut is transmitted to the base body of the brake device and, on the other hand, the first brake element brakes the rotation of the one of the spindle rod and spindle nut to a standstill in the event of activation of the brake device by displacing the first centrifugal body into the coupling position.

Further advantages, properties, and developments of the present disclosure emerge from the following description of a preferred exemplary embodiment and from the dependent claims.

BRIEF SUMMARY OF THE DRAWINGS

The present disclosure is explained in more detail below with reference to the accompanying drawings using a preferred exemplary embodiment.

DETAILED DESCRIPTION

Figure 1:
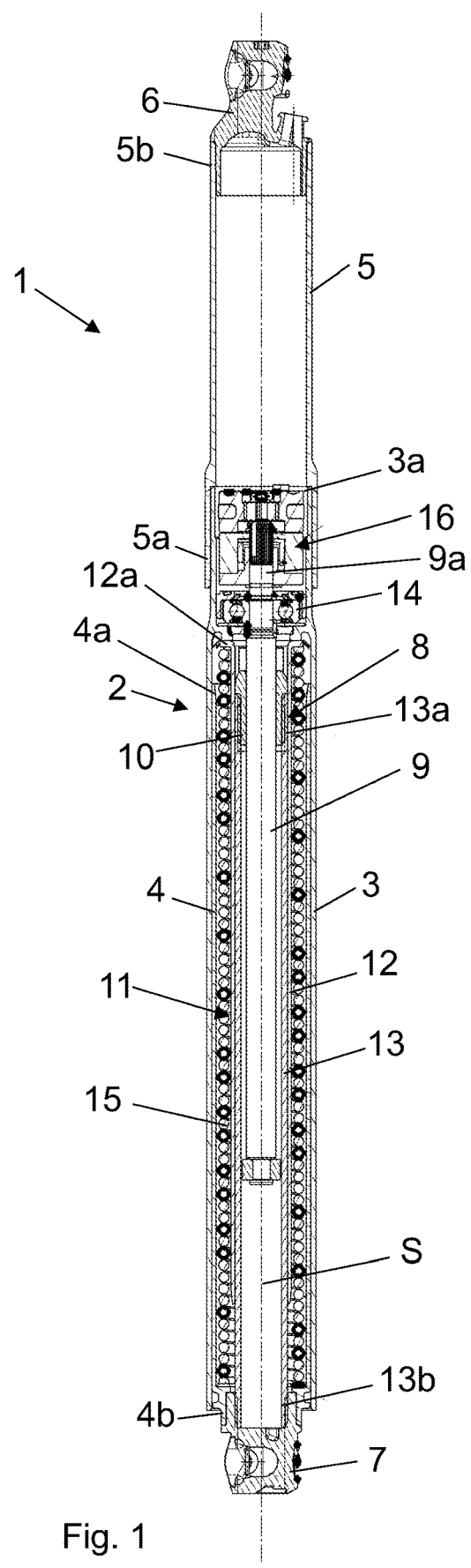
FIG. 1 shows a cross-sectional view of a preferred exemplary embodiment of a support device.

FIG. 1 shows a cross-sectional view of a preferred exemplary embodiment of a support device 1. The support device 1 comprises a housing 2, wherein the housing 2 comprises a first housing part 3 and a second housing part 4, which are arranged to be movable relative to each other. In the present case, the second housing part 4 is guided in the first housing part 3 and is telescopically movable, so that the overall length of the housing 2 can be telescopically changed by moving the first housing part 3 relative to the second housing part 4.

Furthermore, the support device 1 comprises a hollow cylindrical sleeve 5, wherein the sleeve 5 is arranged at a first end 3a of the first housing part 3 and is firmly connected to this first end 3a. A first end 5a of the sleeve 5 runs around a portion of the first end 3a of the first housing part 3 and is connected to it via an interference fit. A first connecting element 6 formed as a ball socket is arranged at a second end 5b of the sleeve 5 opposite the first end 5a of the sleeve 5, so that the support device 1 can be connected in an articulated manner to one of the vehicle flap and vehicle body via the first connecting element 6.

The second housing part 4 has a first end 4a, which is pushed into the first housing part 3. A second connecting element 7 formed as a ball socket is fastened to a second end 4b of the second housing part 4 opposite the first end 4a, so that the support device 1 can be connected in an articulated manner to the other of the vehicle flap and vehicle body via the second connecting element 7.

A spindle drive 8 is arranged in the housing 2, which spindle drive comprises a spindle rod 9 and a spindle nut 10 arranged on the spindle rod 9. The spindle rod 9 and the spindle nut 10 are arranged in a telescopic guide housing part 11, wherein the guide housing 11 comprises a first guide housing part 12 and a second guide housing 13 guided telescopically in the first guide housing part 12.

The spindle rod 9 is mounted rotatably about a spindle axis S in a bearing device 14 arranged in the first housing part 3 formed as a ball bearing. The spindle nut 10 is firmly connected to a first end 13a of the second guide housing part 13, so that when the spindle rod 9 rotates about the spindle axis S, the second guide housing part 13 is axially moved together with the spindle nut 10 relative to the first guide housing part 12.

The first guide housing part 12 is firmly connected to the first housing part 3 by a first end 12a and the second guide housing part 13 is firmly connected to the second connecting element 7, and thus also to the second housing part 4, by a second end 13b overlying the first end 13a, since the second connecting element 7 is connected to the second end 4b of the second housing part 4. As a result, in the event of an external force on the housing 2, in particular by adjusting a vehicle flap coupled to the support device 1 on one side by means of a drive device or also by manual adjustment, with which a user exerts a force on the vehicle flap or simply by the weight of the gear flap itself, which acts on the housing 2 in the direction of the spindle axis S, causes a rotation of the spindle rod 9 about the spindle axis S.

Furthermore, the support device 1 comprises a pretensioning means 15 formed as a helical compression spring, which is supported on one side on the first end 12a of the first guide housing part 12, which is firmly connected to the first housing part 3, and on the other side on the second end 4b of the second housing part 4, so that the pretensioning means 15 pretensions the second housing part 4 relative to the first housing part 3 in the direction of extension. Advantageously, the pretensioning means 15 causes the support device 1 to pretension the vehicle flap in the opening direction or at least act against a closing movement of the vehicle flap.

In order to prevent a vehicle flap from being moved without any braking at high speed in the closing direction, in particular by its own weight, in particular if the drive device on one side fails or the mechanical connection of the drive device between the vehicle and the vehicle body is interrupted and the support device 1 now has to support the entire weight of the vehicle flap alone, the support device 1 has a brake device 16 that at least brakes or stops the movement of the vehicle flap. Advantageously, injuries to people located in the movement space of the vehicle flap that occur due to movements of the vehicle flap without any braking are prevented or at least greatly mitigated.

The brake device 16 is coupled to a first end 9a of the spindle rod 9, so that the brake device 16 is activated by the centrifugal forces that then occur when the rotational speed of the spindle rod 9 exceeds a threshold value and advantageously brakes and rapidly stops the rotary movement of the spindle rod 9 and thus also the sudden movement of the vehicle flap relative to the vehicle body.

Figure 2:
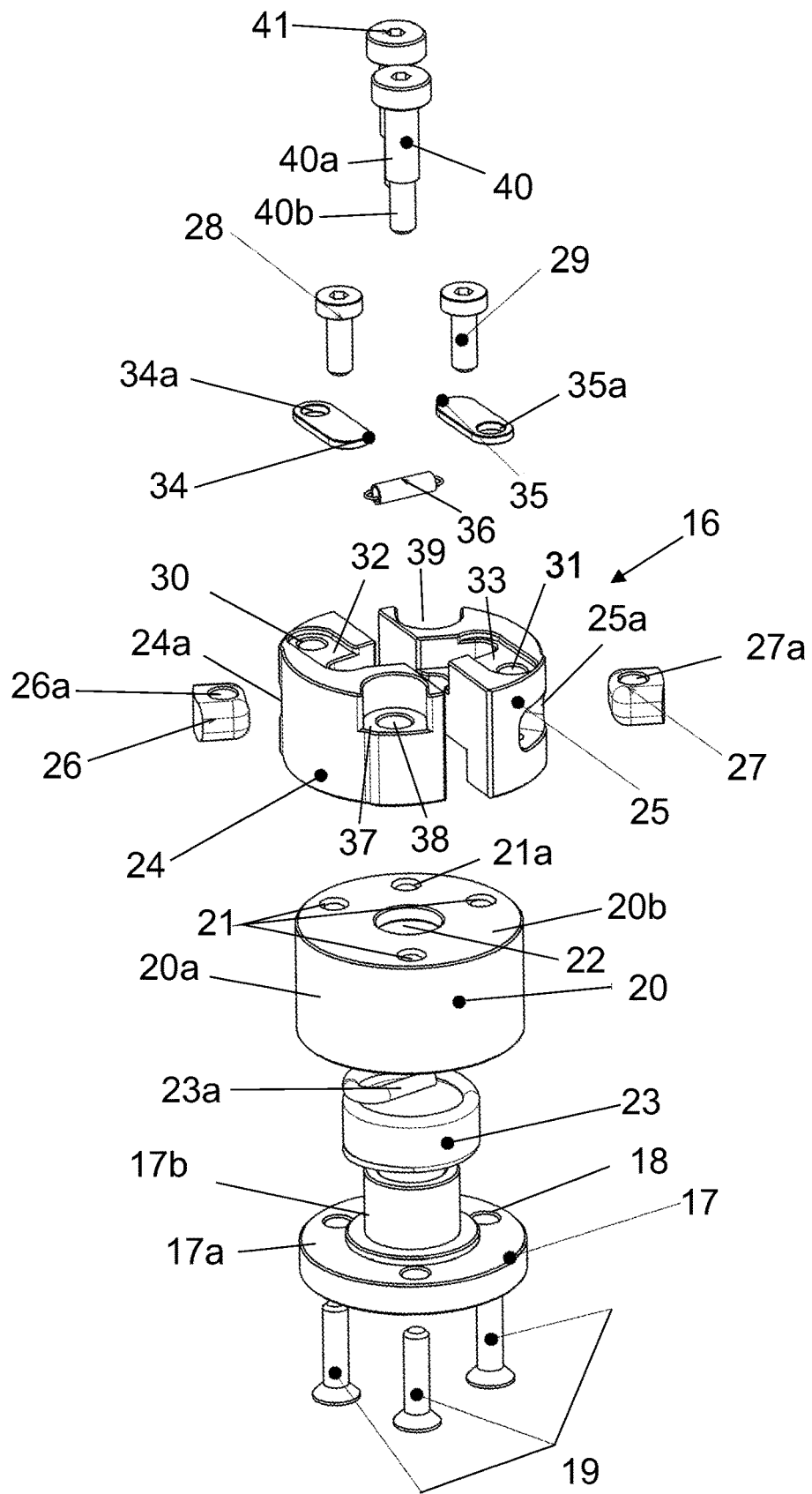
FIG. 2 shows an exploded view of the brake device shown in FIG. 1.

FIG. 2 shows an exploded view of the brake device 16 shown in FIG. 1. The brake device 16 comprises a base part 17, which comprises an annular flange 17a and a hollow cylindrical central extension 17b. The annular flange 17a has a plurality of bores 18, which are provided for the passage of countersunk head screws 19.

Furthermore, the brake device 16 comprises a base body 20, wherein the base body 20 is designed in the shape of a pot. The base body 20 comprises a hollow cylindrical outer wall 20a, which has bores 21 aligned with the bores 18 of the base part 17 with internal threads provided in portions therein. Advantageously, the base body 20 can thus be connected to the base part 17 by screwing it together using the countersunk head screws 19. Furthermore, the base body 20 comprises a base 20b, which has a central opening 22.

Furthermore, the base body 20 comprises additional bores 21a.

A wrap spring 23 is arranged between the base part 17 and the base body 20, which wrap spring is arranged between the spindle rod 9 in FIG. 1 and the base body 20 and can slip when a defined force is applied to the base body 20. The wrap spring 23 comprises a coil end 23a, which is flattened and can be coupled to the spindle rod 9. The wrap spring 23 acts as the first brake element between the spindle drive 8 and the base body 20, which wrap spring also transmits the rotation of the spindle rod 9 to the brake device 16, here in particular to the base body 20. Advantageously, it is thereby possible to move the vehicle flap manually in the closing direction even when the brake device 16 is activated. The wrap spring 23 also advantageously prevents the vehicle flap from swinging open if the brake device 16 is triggered or activated, since the wrap spring 23 slips with respect to the base body 20.

Furthermore, the brake device 16 comprises a first centrifugal body 24 and a second centrifugal body 25, which are each pivotably coupled to the base body 20 about a pivot axis. In a radial recess 24a of the first centrifugal body 24, a first friction element 26 can be inserted which comes into contact with the housing 2 of the support device 1 when the first centrifugal body 24 is deflected outwards by centrifugal force and thereby generates a braking force. Similarly, in a radial recess 25a of the second centrifugal body 25, a second friction element 27 can be inserted which comes into contact with the housing 2 of the support device 1 when the second centrifugal body 25 is deflected outwards by centrifugal force and thereby generates a braking force.

The first friction element 26 and the second friction element 27 in each case have bores 26a, 27a on their upper sides and are in each case fixed in their respective recesses 24a, 25a of the first centrifugal body 24 or second centrifugal body 25 by a first countersunk head screw 28 and a second countersunk head screw 29, so that the friction elements 26, 27 protrude only partially from the recesses 24a, 25a and are thus brought into contact with the housing 2 of the support device 1 when the centrifugal bodies 24, 25 are deflected. For this purpose, the first countersunk head screw 28 and the second countersunk head screw 29 are screwed into the bores 26a, 27a.

The first countersunk head screw 28 passes through a first bore 30 provided above the recess 24a of the first centrifugal body 24 on an end face of the first centrifugal body 24, and the second countersunk head screw 29 passes through a first bore 31 provided above the recess 25a of the second centrifugal body 25. The first bore of the first centrifugal body 24 is provided in a first depression 32 of the end face of the first centrifugal body 24 and the first bore 31 of the second centrifugal body 25 is provided in a first depression 33 of the end face of the second centrifugal body 25. A first cover element 34 is insertable into the first depression 32, wherein the first cover element 34 has a bore 34a that is aligned with the first bore 30 of the first centrifugal body 24.

A second cover element 35 can be inserted into the first depression 33 of the second centrifugal body 25, wherein the second cover element 35 has a bore 35a that is aligned with the first bore 31 of the second centrifugal body 25. Advantageously, the first cover element 34 or the second cover element 35 can be secured in the first depressions 32, 33 by the first countersunk head screw 28 or the second countersunk head screw 29. The first depressions 32, 33 further advantageously have cross-sectional profiles matching the outer contour of the cover elements 34, 35, so that the cover elements 34, 35 are secured against slipping out of the first centrifugal body 24 or the second centrifugal body 25.

A tension spring 36 is arranged between the first centrifugal body 24 and the second centrifugal body 25, which mechanically ensures that the first centrifugal body 24 and the second centrifugal body 25 are pretensioned against each other. When the first centrifugal body 24 and the second centrifugal body 25 rotate about a common central axis, a centrifugal force acts which is directed against the pretensioning force caused by the tension spring 36, so that, when a threshold value of a rotational speed is exceeded, the first centrifugal body 24 and the second centrifugal body 25 are in each case deflected outwards, overcoming the tensioning force of the tension spring 36, and the brake device 16 is thus activated.

The first centrifugal body 24 also has a second depression 37 on its end face, in which a second bore 38 is provided. Similarly, the second centrifugal body 25 has a second depression 39 on its end face, in which a second bore (not shown here) is provided. A first fitting screw 40 can be passed through the second bore 38, wherein the first fitting screw 40 has a smooth bearing portion 40a and a threaded portion 40b at a lower end.

The second bore 38 of the first centrifugal body 24 has an internal diameter that corresponds approximately to the external diameter of the bearing portion 40a of the first fitting screw 40. The threaded portion 40b of the first fitting screw 40 is screwed into a bore 21 of the base body 20, which has an internal thread, so that the first centrifugal body is secured axially on the base body 20, but is rotatable about the bearing portion 40a of the first fitting screw 40.

Similarly, a second fitting screw 41 can be passed through a second bore (not shown here) in the second depression 39 of the second centrifugal body 25, wherein the second centrifugal body 25 is axially secured on the base body 20 via the second fitting screw 41, but can be rotated about the bearing portion of the second fitting screw 41.

Figure 3:
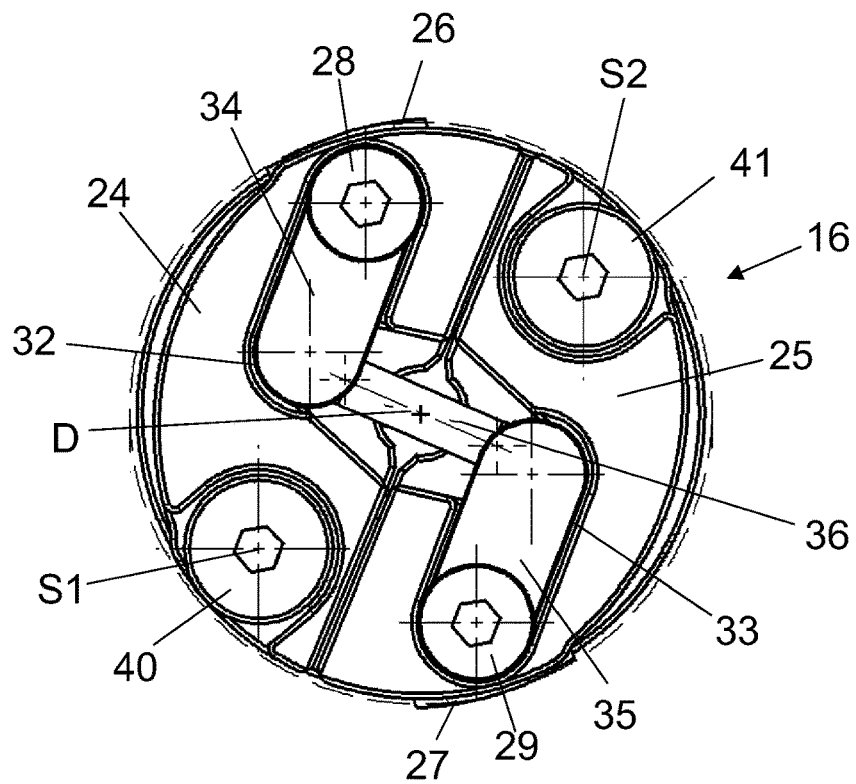
FIG. 3 shows the brake device shown in FIG. 2 in a deactivated state from a bird's eye view.

FIG. 3 shows the brake device 16 shown in FIG. 2 in a deactivated state from a bird's eye view. In this view, it can be seen that in the deactivated state of the brake device 16, the first centrifugal body 24 and the second centrifugal body 25 are pretensioned against each other via the tension spring 36 and are in contact on the inside. This corresponds to a decoupling position, in which the first centrifugal body 24 and the second centrifugal body 25 do not rotate or do not rotate rapidly enough about a common central axis of rotation D, so that no or only a small centrifugal force acts against the pretensioning force of the tension spring 36. The pretensioning force provided by the tension spring 36 is advantageously selected such that the rotational speeds occurring during normal operation of the vehicle flap generate a smaller centrifugal force on the first centrifugal body 24 or the second centrifugal body 25 compared to the pretensioning force, so that no additional braking force is generated by the brake device 16 or the support device 1 during normal manual adjustment of the vehicle flap or, if applicable, during automatic adjustment of the vehicle flap provided by a drive device.

It can also be seen that the first cover element 34 is fastened in the first depression 32 of the first centrifugal body 24 by means of the first countersunk head screw 28 and the second cover element 35 is fastened in the first depression of the second centrifugal body 25 by means of the second countersunk head screw 29.

The first fitting screw 40 forms a first pivot axis S1, about which the first centrifugal body 24 can be pivoted or rotated. Similarly, for this purpose, the second fitting screw 41 forms a second pivot axis S2, about which the second centrifugal body 25 can be pivoted or rotated. In the deactivated state of the brake device 16 shown here, the first centrifugal body 24 and the second centrifugal body 25 are rotated clockwise about the first pivot axis S1 and the second pivot axis S2, respectively, due to the pretensioning force acting through the tension spring 36, wherein the first centrifugal body 24 and the second centrifugal body 25 thereby contact each other and block further pivoting or rotation about their respective pivot axis S1 and S2.

In the deactivated state shown here, the radially outwardly projecting first friction element 26 arranged in the first centrifugal body 24 or the radially outwardly projecting second friction element 27 arranged in the second centrifugal body 25 is not in contact with an inner diameter of a fixed component within the support device 1, so that no additional braking force acts on a rotary movement of the spindle rod 9 or a pivoting of a vehicle flap.

Figure 4:
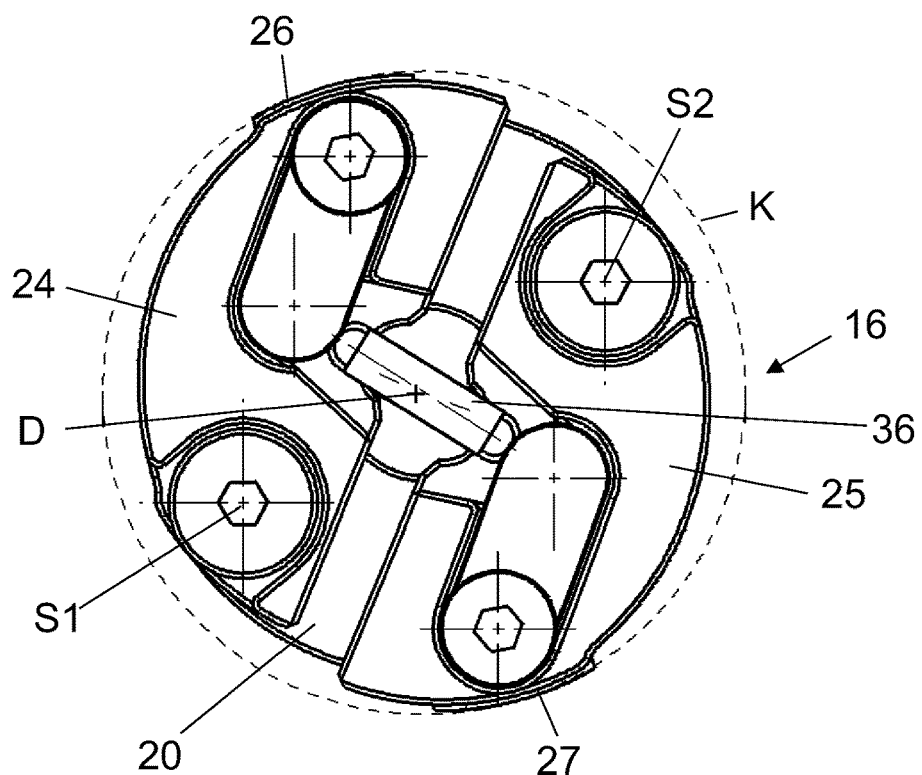
FIG. 4 shows the brake device shown in FIG. 2 in an activated state from a bird's eye view.

FIG. 4 shows the brake device 16 shown in FIG. 2 in an activated state from a bird's eye view. The brake device 16 is in this state if the first centrifugal body 24 and the second centrifugal body 25 rotate rapidly enough about the common central axis of rotation D and corresponding centrifugal forces act on the first centrifugal body 24 and the second centrifugal body 25. As can be seen, the centrifugal forces occurring due to the rotation cause the first centrifugal body 24 to be pivoted or rotated about its first pivot axis S1 counterclockwise outwards into a coupling position against the tensile force acting through the tension spring 36 and likewise the second centrifugal body 25 to be pivoted or rotated about the second pivot axis S2 counterclockwise outwards into a coupling position against the tensile force acting through the tension spring 36.

With the first centrifugal body 24, the first friction element 26, which is arranged and projects radially outwards, was displaced radially further outwards, so that it can come into contact with the housing 2 (not shown here) and a braking force is thus generated. Accordingly, with the second centrifugal body 25, the second friction element 27 arranged therein and projecting radially outwards was displaced radially further outwards, so that it can also come into contact with the housing 2 (not shown here) and a braking force is also generated. Accordingly, the first centrifugal body 24 and the second centrifugal body 25 no longer contact each other.

The dashed line shows a circle K, on which the first friction element 26 and the second friction element 27 move in the deflected state of the first centrifugal body 24 and the second centrifugal body 25. As can be seen, the diameter of the circle K is larger than the diameter of the base body 20 arranged under the first centrifugal body 24 or the second centrifugal body 25. Accordingly, a rotation of the first centrifugal body 24 or the second centrifugal body 25 about the central axis of rotation D causes the first friction element 26 and the second friction element 27 to contact an inner diameter of a stationary component within the support device 1 and can thus cause a corresponding braking of the rotary movement if the rotational speed exceeds a predefined threshold value. The first centrifugal body 24 and the second centrifugal body 25 are clamped to the component fixed to the housing, here the housing 2, in a rotationally fixed manner. A self-reinforcing braking force is thereby achieved at least for the rotation of the first centrifugal body 24 and the second centrifugal body 25 in a first direction of rotation, which has the effect that the first centrifugal body 24 and the second centrifugal body 25 remain in the coupling position even when the centrifugal force is no longer acting and are only displaced back into the decoupling position under the influence of the tensile force of the tension spring 36 when they are rotated in a second direction of rotation opposite to the first direction of rotation.

Figure 5:
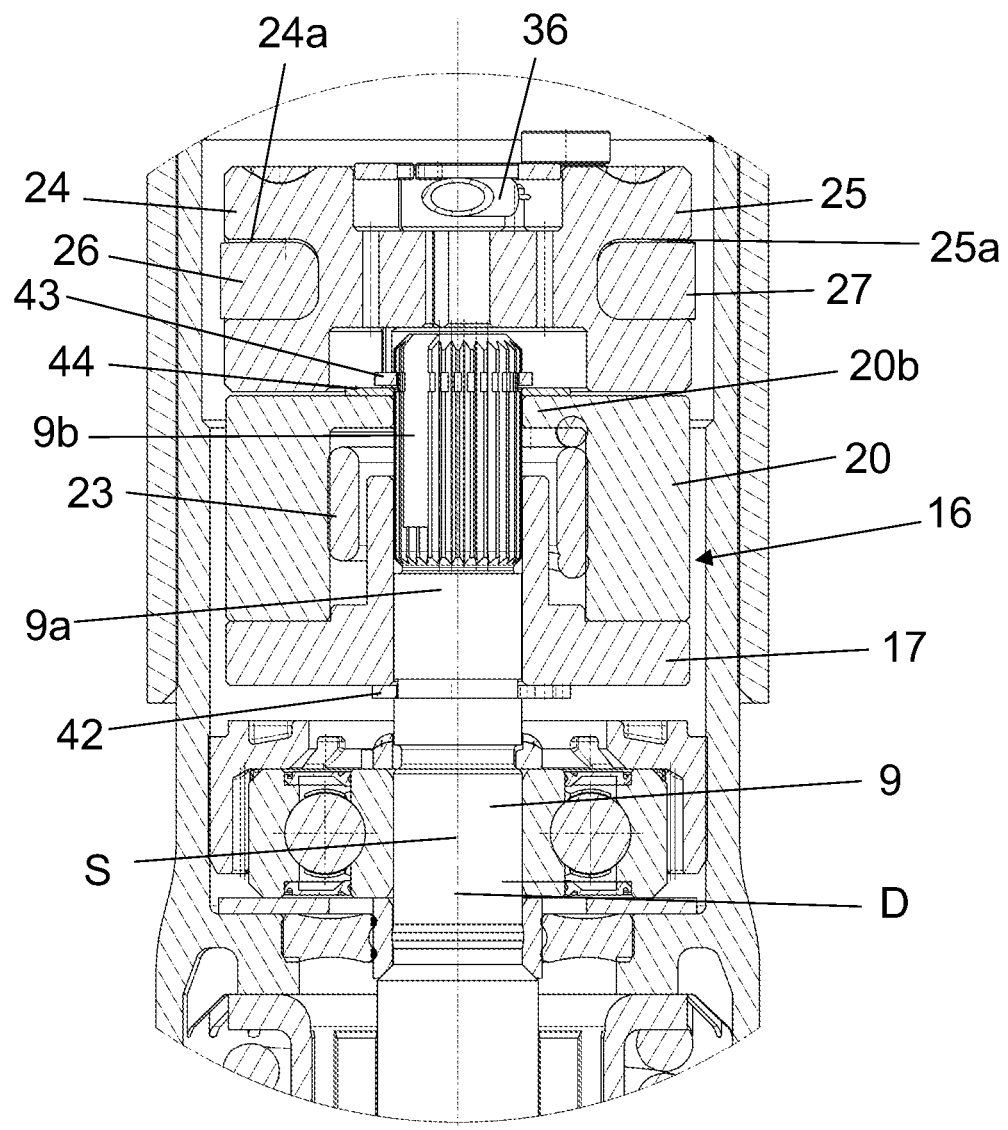
FIG. 5 shows an enlarged partial view of the support device 1 shown in FIG. 1 in the region of the brake device 16.

FIG. 5 shows an enlarged partial view of the support device 1 shown in FIG. 1 in the region of the brake device 16. In this view, it can be seen that the brake device 16 is deactivated, since the first centrifugal body 24 with the first friction element 26 arranged in the radial recess 24a or the second centrifugal body 25 with the second friction element 27 arranged in the radial recess 25a is radially at a distance from the first housing part 3 and thus no braking force is provided by the brake device 16.

The base part 17 and the base body 20 arranged on the base part 17 are set axially at the first end 9a of the spindle rod 9 by a first retaining ring 42, which rests against a lower side of the base part 17, and by a second retaining ring 43, which is arranged above the base 20b of the base body 20. A spacer sleeve 44 is arranged between the second retaining ring 43 and the base 20b of the base body 20.

The first end 9a of the spindle rod 9 has a slot-shaped recess 9b, into which the coil end 23a (see FIG. 2) of the wrap spring 23 (not shown here) is inserted, so that the wrap spring 23 is rotated when the spindle rod 9 is rotated about the spindle axis S or about the coaxial central axis of rotation D. The wrap spring 23 is frictionally connected to an inner side of the hollow cylindrical outer wall 20a of the base body 20 by pressing it into the base body 20. If a set threshold value of the rotational speed of the wrap spring 23 or of the base body 20 coupled to the wrap spring 23 is exceeded, the first centrifugal body 24 or the second centrifugal body 25 connected to the base body 20 is deflected outwards against the pretensioning of the spring part 36, so that the first friction element 26 or the second friction element 27 comes into contact with an inner side of the first housing part and thus causes the rotation of the spindle rod 9 to stop. The wrap spring 23 absorbs the sudden braking effect by slipping and prevents the spindle rod 9 from being brought to a sudden stop, so that undesired vibrations in the support device or the vehicle flap that has fallen with the support device are avoided. Furthermore, the wrap spring 23 enables the reset to be effected by manual movement of the vehicle flap when the brake device 16 is already activated, by transmitting the rotation of the spindle rod 9 in a direction of rotation corresponding to the opening movement of the vehicle flap to the base body 20 and thus displacing the first centrifugal body 24 and second centrifugal body 25 into the decoupling position. Furthermore, the vehicle flap can still be moved manually in the closing direction by applying appropriate force, since the wrap spring 23 then slips with respect to the rotationally fixed base body 20.

The present disclosure is explained above with reference to an exemplary embodiment with which the centrifugal bodies are arranged opposite each other. It is understood that more than two centrifugal bodies can also be provided.

What is claimed is:

1. A support device for a vehicle flap, comprising
a housing which can be connected between the vehicle flap and the vehicle body, and which comprises at least a first housing part and a second housing part, wherein the first housing part and the second housing part are displaceable relative to each other in a telescopically guided manner,
a spindle drive which is coupled to the housing, wherein the spindle drive comprises a spindle rod and a spindle nut in thread engagement with the spindle rod,
wherein one of the spindle rod and spindle nut is arranged in the housing rotatably about a spindle axis and the other of the spindle rod and spindle nut is arranged in the housing non-rotatably, and
a first brake device which is coupled to the one of the spindle rod and the spindle nut in order to brake the rotation of the one of the spindle rod and the spindle nut,
wherein the first brake device can be activated by rotation relative to the housing about a central axis of rotation via centrifugal forces, wherein the brake device comprises a brake element, which is coupled to the one of the spindle rod and the spindle nut, wherein the brake device comprises a base body, wherein the first brake element is frictionally coupled to the base body and the base body is coupled to the first centrifugal body, wherein the first brake element is designed as a wrap spring, which is pressed into the base body.

2. The support device according to claim 1, wherein the rotation of the brake device about the central axis of rotation can be driven by rotation of one of the spindle rod and spindle nut about the spindle axis.

3. The support device according to claim 1, wherein the first brake device comprises a first centrifugal body, wherein the first centrifugal body is displaced into a coupling position when a threshold value of a rotational speed of the first brake device about the central axis of rotation is exceeded, and the first centrifugal body is coupled in the coupling position in a rotationally fixed manner with respect to the housing.

4. The support device according to claim 3, wherein the first centrifugal body is pivotable about a first pivot axis.

5. The support device according to claim 3, wherein the first centrifugal body can be extended radially outwards.

6. The support device according to claim 3, wherein the first centrifugal body remains in the coupling position even after the rotational speed of the brake device has fallen below the threshold value.

7. The support device according to claim 3, wherein the first centrifugal body can be displaced into the coupling position by rotating the brake device in a first direction of rotation and the first centrifugal body can be displaced from the coupling position to a decoupling position by rotating the brake device in a second direction of rotation opposite to the first direction of rotation.

8. The support device according to claim 3, wherein the brake device comprises a spring part, which is provided for pretensioning the first centrifugal body against the centrifugal forces.

9. The support device according to claim 4, wherein the brake device comprises a second centrifugal body, which is pivotable about a second pivot axis.

10. The support device according to claim 9, wherein the second pivot axis is at a distance from the central axis of rotation, about which the first centrifugal body and the second centrifugal body can rotate together.

11. The support device according to claim 9, wherein a spring part is arranged between the first centrifugal body and the second centrifugal body, wherein the spring part pretensions the first centrifugal body and the second centrifugal body radially towards each other in the direction of the central axis of rotation.

12. The support device according to claim 3, wherein the first centrifugal body in the coupling position is coupled in a rotationally fixed manner with respect to the housing by means of force fit.

13. The support device according to claim 9, wherein the first centrifugal body particularly preferably has a first friction element.

14. The support device according to claim 13, wherein the first friction element is received and fastened in a recess in the first centrifugal body, wherein the first friction element protrudes radially from the first centrifugal body.

15. The support device according to claim 14, wherein the second centrifugal body has a second friction element, wherein the second friction element is received and fastened in a recess in the second centrifugal body.

16. The support device according to claim 15, wherein the second friction element protrudes radially from the second centrifugal body.

17. The support device according to claim 15, wherein the first friction element is detachable and connected to the first centrifugal body and the second friction element is detachable and connected to the second centrifugal body.

18. The support device according to claim 3, wherein the first centrifugal body in the coupling position is coupled in a rotationally fixed manner with respect to the housing by means of a form fit.

19. The support device according to claim 1, wherein the central axis of rotation and the spindle axis are coaxial.

20. The support device according claim 1, wherein the first brake element has a first end configured for being coupled to one of the spindle rod and the spindle nut.

* * * * *